(12) United States Patent
Reed

(10) Patent No.: US 11,858,079 B2
(45) Date of Patent: Jan. 2, 2024

(54) LOCK AND PIN COMBINATION FOR COLD WORKING CRACKS

(71) Applicant: LOCK-N-STITCH, INC., Turlock, CA (US)

(72) Inventor: Gary Reed, Turlock, CA (US)

(73) Assignee: LOCK-N-STITCH, INC., Turlock, CA (US)

( * ) Notice: Subject to any disclaimer, the term of this patent is extended or adjusted under 35 U.S.C. 154(b) by 0 days.

(21) Appl. No.: 17/941,532

(22) Filed: Sep. 9, 2022

(65) Prior Publication Data

US 2023/0113370 A1   Apr. 13, 2023

Related U.S. Application Data

(63) Continuation of application No. 17/114,787, filed on Dec. 8, 2020, now Pat. No. 11,465,246.

(51) Int. Cl.
| | | |
|---|---|---|
| *B23P 6/04* | (2006.01) | |
| *F16B 35/04* | (2006.01) | |
| *F16B 5/00* | (2006.01) | |
| *F16B 33/00* | (2006.01) | |

(52) U.S. Cl.
CPC .............. *B23P 6/04* (2013.01); *F16B 5/0052* (2013.01); *F16B 35/041* (2013.01)

(58) Field of Classification Search
CPC ........ B23P 6/04; F16B 35/041; F16B 33/004; F16B 5/0052; Y10T 29/49735; Y10T 403/16; Y10T 403/553
See application file for complete search history.

(56) References Cited

U.S. PATENT DOCUMENTS

| | | | | |
|---|---|---|---|---|
| 2,506,233 A * | 5/1950 | Murphy | ..................... | B23P 6/04 52/514 |
| 4,662,806 A * | 5/1987 | Reed | ......................... | B23P 6/04 411/2 |
| 4,824,279 A * | 4/1989 | Casazza | ................ | F16B 35/041 403/294 |
| 4,845,828 A * | 7/1989 | Reed | ......................... | B23P 6/04 29/402.15 |
| 5,379,505 A * | 1/1995 | Reed | ........................ | B23G 5/06 29/888.011 |
| 5,417,532 A * | 5/1995 | Reed | ......................... | B23P 6/04 52/514 |
| 6,212,750 B1 * | 4/2001 | Reed | ......................... | B23P 6/04 29/402.09 |
| 6,725,518 B2 * | 4/2004 | Reed | ......................... | B23P 6/04 29/402.11 |
| 7,513,024 B2 * | 4/2009 | Keller | ................. | E04G 23/0218 29/402.09 |

* cited by examiner

*Primary Examiner* — Bayan Salone
(74) *Attorney, Agent, or Firm* — BACON & THOMAS, PLLC

(57) ABSTRACT

A lock and pin for the structural and fluid tight repair of cracks not amenable to high temperature repairs or synthetic material patches. Fluid tight pins and locks seal the crack while one or more locks prevent the crack from growing. These repairs need to endure the remaining life cycle of the machinery part while withstanding all the strain, pressure, heat and expansion and contraction of the part before the crack(s) were formed. Often these cracks evolved due to engineering design flaws that will require even greater strength from these areas than when new.

15 Claims, 12 Drawing Sheets

LOCK AND PIN COMBINATION FOR COLD WORKING CRACKS

FIELD OF THE INVENTION

This invention relates generally to repairing damaged cast metal components and particularly to an apparatus and method for cold metal repair for breaks, cracks and other damage without the associated problem caused by welding.

BACKGROUND OF THE INVENTION

A great number of machines in use today rely upon cast metal parts or "castings" for strength and reliability. Cast metals are frequently selected as the preferred means of fabricating high strength machine components in a virtually endless variety of machine environments. Such cast metal parts include engine blocks, pump housings, manifolds, turbine shells, valve bodies, architectural structures and the like. In large industrial or commercial-type machines, the castings used in many applications are correspondingly large, costly or non-replaceable. With all the advantages which cast metals provides to the machine fabricator and designer, metal castings are subject to several limitations. Perhaps the most significant limitation in the attractiveness of cast metal fabrications in many large machine environments arises from the difficulty of repairing such castings in the event they become cracked, broken or otherwise damaged. In small machines, the castings used are correspondingly small and casting replacement does not present a significant limitation. This is because small machines may usually be disassembled to completely replace a small broken casting. In some environments, even relatively modest sized machines are placed in operational environments or physically constricted areas which make disassembly of the machine for casting replacement costly even if a new one is available. In large machines, the size and cost of castings makes their replacement very time consuming, impractical "and" difficult. In certain environments in which large machines are used, such as very old systems, the replacement of a damaged casting may be virtually impractical.

The difficulties and high costs associated with casting replacement in operating environments such as those described above create a need in the art for apparatus and methods which permit repair rather than replacement of damaged cast and fabricated metal parts in-situ. However, a significant disadvantage associated with castings and fabrications is the difficulty of repairing them once they are cracked or otherwise damaged. The metal structure of most cast metals does not tolerate the use of conventional metal repair techniques such as welding or brazing in-situ due to the heat associated with such repair processes. In essence, the application of heat which accompanies welding or brazing repairs alters the metal structure of the casting and creates discontinuities of the surrounding metal. These variations and discontinuities weaken the overall casting strength in the region of the repair and are, as a result, undesirable and unsatisfactory. Other systems have been tried utilizing adhesive bonding materials such as epoxy or the like. Such systems may be satisfactory for extremely limited applications but have not enjoyed general success in meeting the needs of permanent casting repair capable of withstanding high stress loads.

In efforts to meet the need for casting repair apparatus and methods which avoid the damaging effects of heat associated with conventional welding or brazing-type processes, practitioners in the art have developed certain "cold metal" repair techniques which do not utilize significant heat in effecting casting repair.

U.S. Pat. No. 4,662,806 issued to Reed sets forth a Metal Lock System and Method for repairing a casting having a crack therein. The metal lock is formed of an elongated rigid member having a plurality of lobes formed from adjacent portions thereof in a generally circular cross-section. A pattern of holes is drilled into the casting, transverse to the crack and one or more elongated metal locks are forced into the transverse drilled pattern to provide a metal locking action intended to prevent the cracked portions from spreading apart. A plurality of threaded holes are then drilled along the crack in an overlapping pattern and a plurality of threaded fasteners or lacing plugs are threaded into the overlapping holes to complete the casting repair. The lacing plugs are provided with a driving head and a break-off groove formed in the fastener. The break-off groove is intended to shear and cause the head portion of the lacing plug to be broken from the threaded remainder once the lacing plug has been threaded into the casting. As a final step, the excess of the lacing plugs extending above the surrounding casting surface may be ground away.

U.S. Pat. No. 4,845,828 issued to Reed sets forth a Method for Repairing a Metal Casting having a Crack or Break Therein which utilizes apparatus of the type set forth in U.S. Pat. No. 4,662,806. The method comprises the drilling of one or more hole patterns transverse to the casting crack which are characterized by alternate large and small diameter holes. One or more correspondingly configured metal locks are embedded into the drilled hole pattern transverse to the casting crack. A plurality of tapered holes are then drilled and tapped along the casting crack in an overlapping arrangement. The drilling process is facilitated by the use of a plurality of drilling fixtures or jigs. A plurality of lacing plugs are threaded into the drilled and tapped apertures. The lacing plugs are configured to include a break away groove which causes the head portion of the lacing plug to shear and separate along the shear groove once the stitching pin is fully seated. After all metal locks and lacing plugs have been installed, the excess plug material may be removed by grinding or other processes.

While the foregoing described prior art apparatus and methods for cold metal repair of damaged castings have enjoyed some success, the environment of casting repair remains extremely demanding and repairs remain difficult. Thus, there remains a continuing need in the art for evermore improved apparatus and methods for casting repair. In particular, there remains a need for repair systems which function to more effectively draw the casting portions on each side of a crack or damaged area together to better prevent spreading of the crack and misalignment of the crack. Some prior art locks have not successfully achieved this function and often actually tend to spread the casting portions adjacent the crack when the locks are installed. Furthermore, the prior art stitching pins or lacing plugs have, in many instances, failed to form a liquid-tight/gas-tight fit when installed within their threaded bores. In addition, the entire casting repair strength is, in many respects, limited to the strength of the transversely placed metal locks themselves together with the strength of the metal lock grip upon the casting portions which receive the metal lock. In prior art locks, the design of the metal locks has generally required that the lock strength be compromised to maintain grip tenacity and thus limit the overall strength of the casting repair.

Thus, there remains a continuing need in the art for an improved apparatus and method for crack repair which overcomes these limitations of the prior art systems.

SUMMARY OF THE INVENTION

Accordingly, it is a general object of the present invention to provide an improved apparatus and method for cold metal crack repair. It is a more particular object of the invention to provide an improved apparatus and method for cold metal crack repair which more securely repairs the crack damage and which draws the repaired casting portions together to provide a stronger repair and prevent spreading of the crack and realignment of the cracked portion.

In accordance with the present invention, there is provided for use in repairing a cracked casting having a crack formed therein, a casting repair apparatus which comprises: at least one elongate metal lock defining a major axis and including a center set of large overlapping circular lobes along the major axis forming the body of the lock, a plurality of medium sized circular lobe pairs equally spaced from the center pair, parallel to the major axis, and a plurality of large circular lobes each centered upon the major axis and interleaved between the medium sized circular lobe pairs in an overlapping arrangement, the plurality of circular lobe pairs all having similar radii of curvature; medium sized lobes on ends of the large circular lobes a plurality of stitching pins; and means for forming at least one metal lock receiving recess having a shape similar to the metal lock but constant in drilled hole spacing to enhance friction fit and stress distribution.

DETAILED DESCRIPTION OF PREFERRED EMBODIMENTS

The features of the present novel invention are set forth with particularity in the appended claims. The invention, together with further objects and advantages thereof, may best be understood by reference to the following description taken in conjunction with the accompanying drawings.

A method and apparatus for repairing a casting in a cold metal repair process includes a plurality of drilling fixtures which facilitate the creation of one or more lock receiving recesses positioned generally transverse to the casting material crack. The lock receiving recesses are formed of two circular bore combinations having "medium-sized" and "large" circular portions to maximize strength. The large circular portions slightly overlap each other in line. The medium circular portions surround the large portions, each spaced from the other, defining pinch points and contact areas. A single or plurality of correspondingly configured metal locks are inserted into the lock receiving recesses to provide transverse drawing and strengthening of the casting material portions on each side of the crack thereby adding additional strength to the repair. A plurality of threaded bores formed along the remainder of the casting crack in overlapping spacing which receive a corresponding plurality of stitching pins. The stitching pin has a conical shoulder formed on the opposite end of a threaded shaft and a break off drive head is coupled to the conical shoulder by a twist-off groove structure. When the stitching pins are inserted into their respective threaded bores, the thread portions facilitate threading the stitching pins into the correspondingly tapped bores using a special tap. The conical shoulder portions are operative to seat against the uppermost threads of the threaded bores to prevent further advancement into the threaded bores. The threaded stitching pins employ a variable pitch double hook thread pattern providing instant interlock with the threads of the receiving bores.

Figure 1:
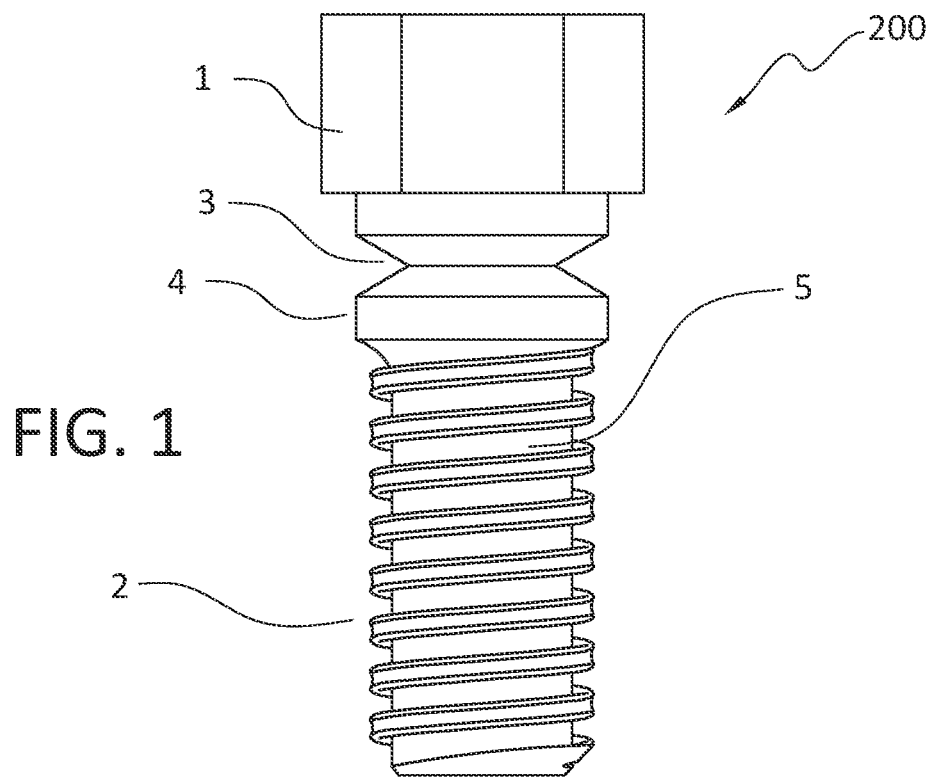
FIG. 1 is a side view of a stitching pin according to a novel metal stitching fastener.

FIG. 1 sets forth a novel metal stitching fastener which defines a stitching pin 200 that is designed to be installed into a crack or joint between two separate pieces so as to create a mechanical connection that can remove a crack completely, create a liquid and gas tight seal without the use of welding that has proven to be severely detrimental to the life of the part whether it be cast iron, cast aluminum, cast or fabricated steel or copper based alloys where welding cannot be performed.

As shown in FIG. 1, hex drive head 1 is oriented at the upper end with threads 2 helically wound around shank 5 and extending to the opposite end. The drive head and threads are separated by break-off groove 3, shoulder 4. The installation of said stitching pin 200 includes slightly overlapping the stitching pins 200 thereby not leaving any spaces between the pins as demonstrated in FIG. 24 along with the reinforcing locks defined below.

Figure 2:
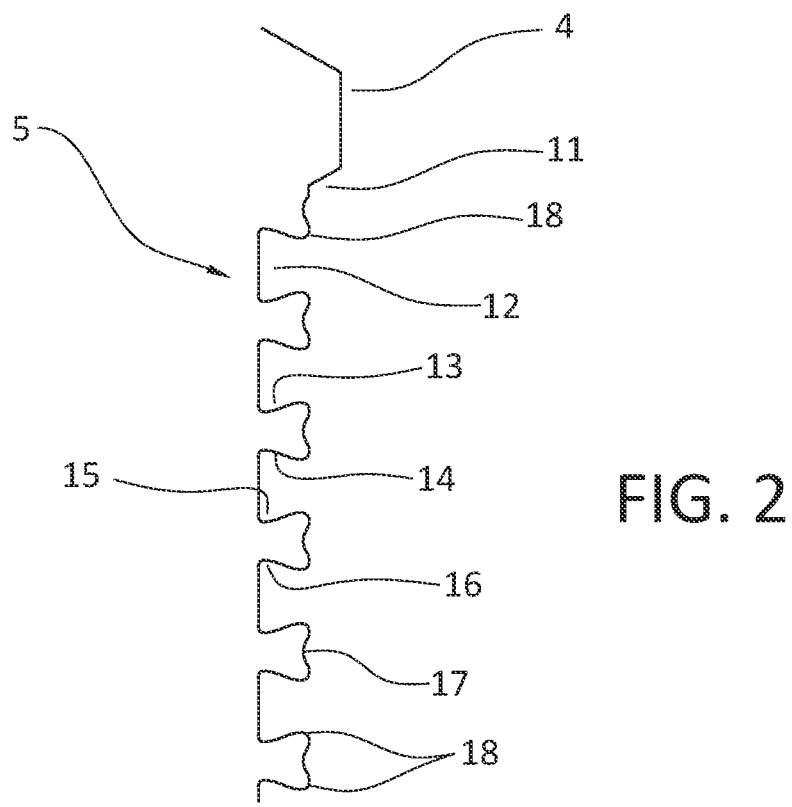
FIG. 2 is a cross section of a threaded shank of said stitching pin of FIG. 1.
Figure 24:
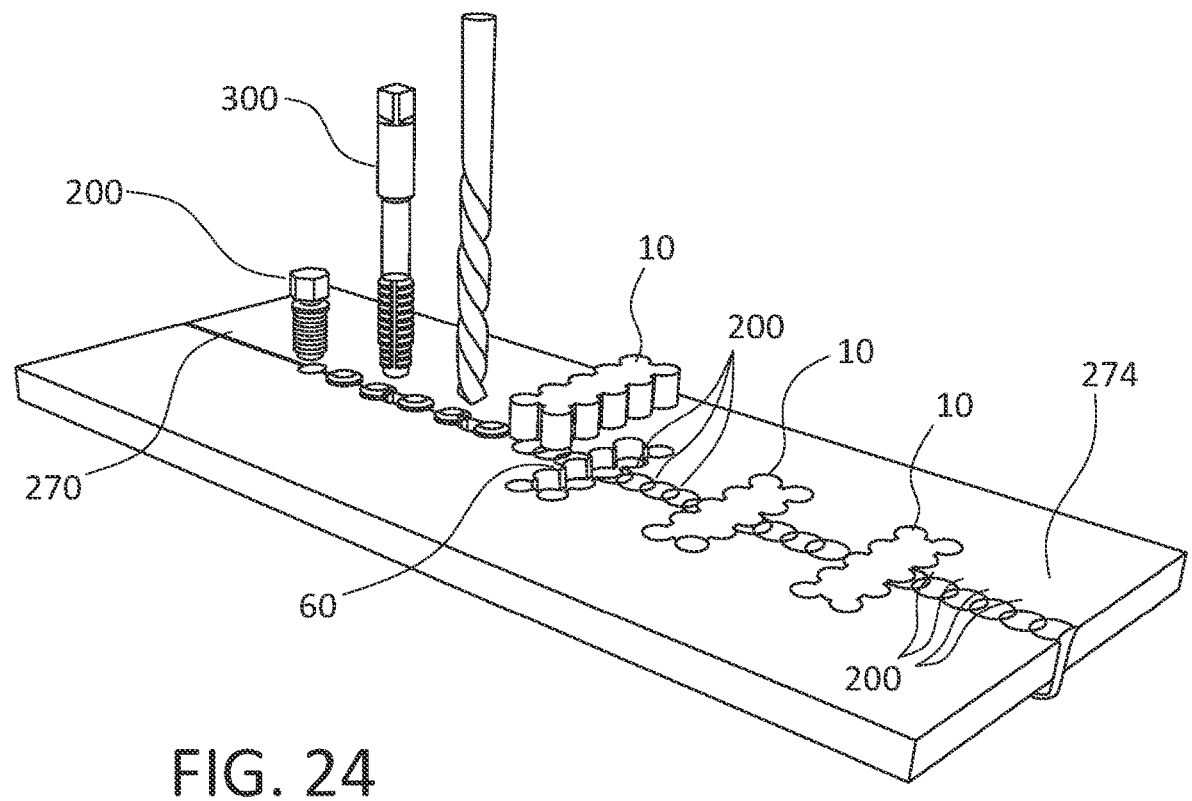
FIG. 24 is a perspective view of a semi completed repair process in progress.

FIG. 2 is a cross section of the threaded shank 5 and shoulder angle 11 of said stitching pin of FIG. 1. It shows details of this unique and novel thread pattern for the purpose of utilizing interlocking threads with radiuses found on all inside 15, 16 and outside 18 corners for the purpose of increasing the strength of the threads while producing an instant interlock with the surrounding metal. As the shoulder angle 11 contacts the surface around the opening of the drilled and tapped hole during installation (FIG. 24), forward rotation is halted and the drive head 1 shears off at breakoff groove 3 when the torque limit is met. Tap contour threads is radiused like Pin 200. The radiuses of the threads intentionally have no sharp angles or edges therefore providing more metal to metal contact in the tapped hole for increased strength and fluid seal with no stress points on the fastener or the matching threaded hole created by a threaded cutting tap 300 (FIG. 24). Prior inventions have weaknesses due to the sharp edges within the threads that are common wherein shear loads often result in cracks and a shortened life of the fastener and or part. Thread root 12 is located between inside corners 15 and 16 which are adjacent to thread tooth flanks 13 and 14. Outside radiused corners 18 are strategically located between flanks 13 and 14, and thread crest inside radius 17. The threaded portion is matched to a special tap 300 shown in FIG. 24 of the same geometries with close fit and manufacturing tolerances to maximize metal to metal contact. Thus, a fluid tight seal is provided by the radii while reducing stress and increasing strength.

Figure 3:
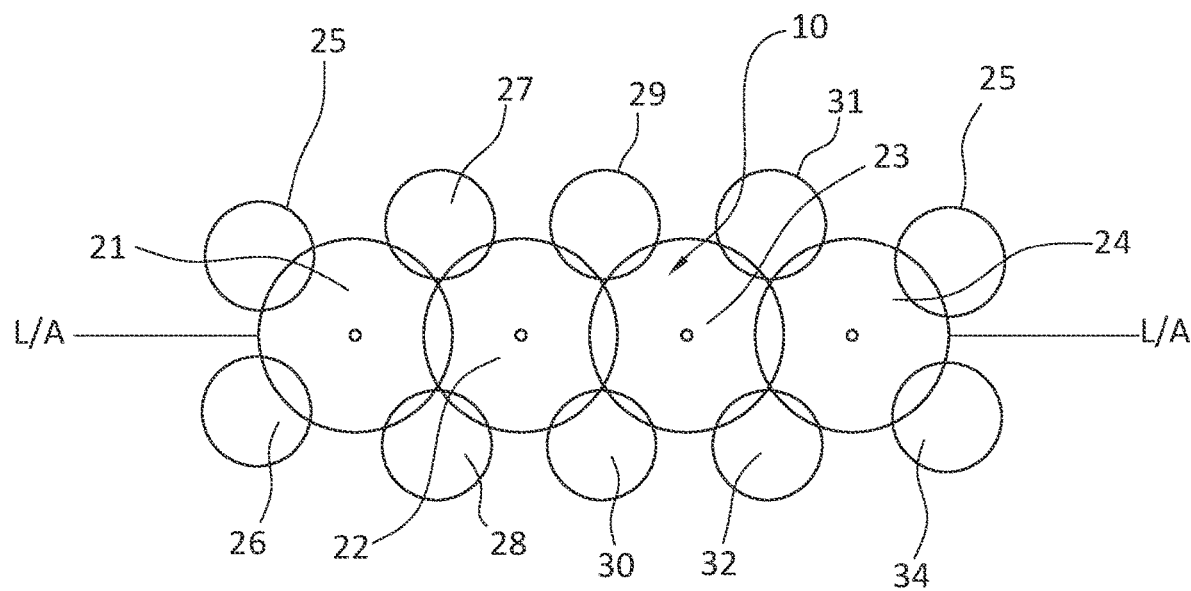
FIG. 3 is a plan view of a metal lock in accordance with the present invention.

FIG. 3 sets forth a view of a metal lock 10 designed in accordance with the present invention with center lobes 21 through 24 and outer lobes 25 through 34. The purpose of the lobes is to provide an interference, high-friction fit thereby preventing separation of the sides of the wall where a crack had formed. The biggest role played by the lock is to replace the strength of the base metal lost due to a crack. Cracks are caused by accidents and often occur during normal operation. Repairing cracked machinery parts saves money, lost operating revenue and jobs. The interference, high-friction fit can be implemented dimensionally.

Figure 4:
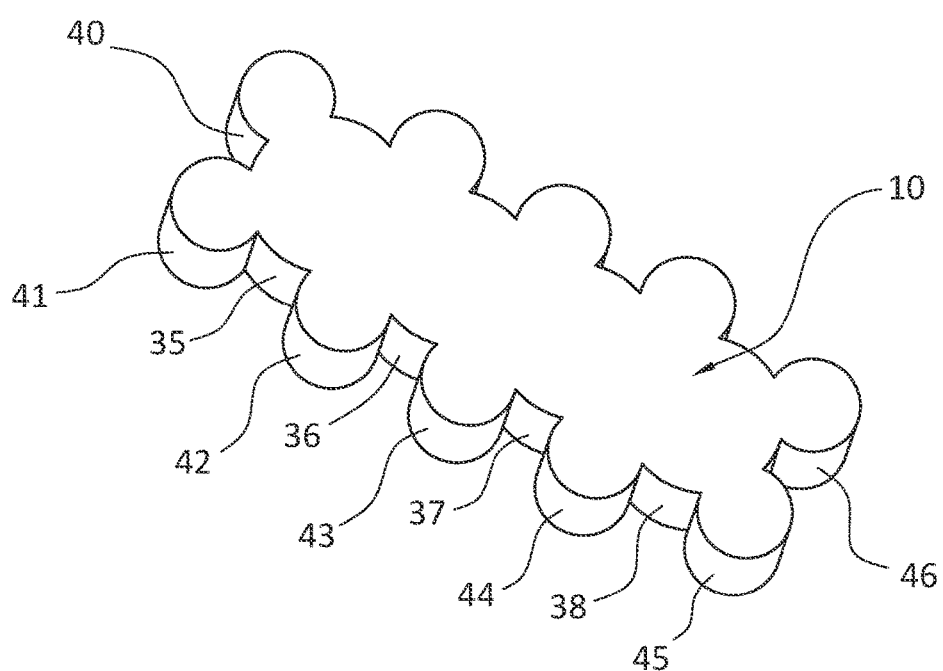
FIG. 4 is a perspective view of the metal lock of FIG. 3.

FIG. 4 sets forth a perspective view of the metal lock 10 of FIG. 3 showing the side walls 35 through 38 of the center four interconnected circular lobes 21 through 24 and the smaller lobe side walls of only lobes 40 through 46 of outer lobes 25-34 of lock 10. The side walls of the locks are produced in various thicknesses to produce a very strong locking member that will be installed into a drilled the lock receiving recess 60 (FIGS. 5 and 6 of almost "matching" geometry.

Figure 5:
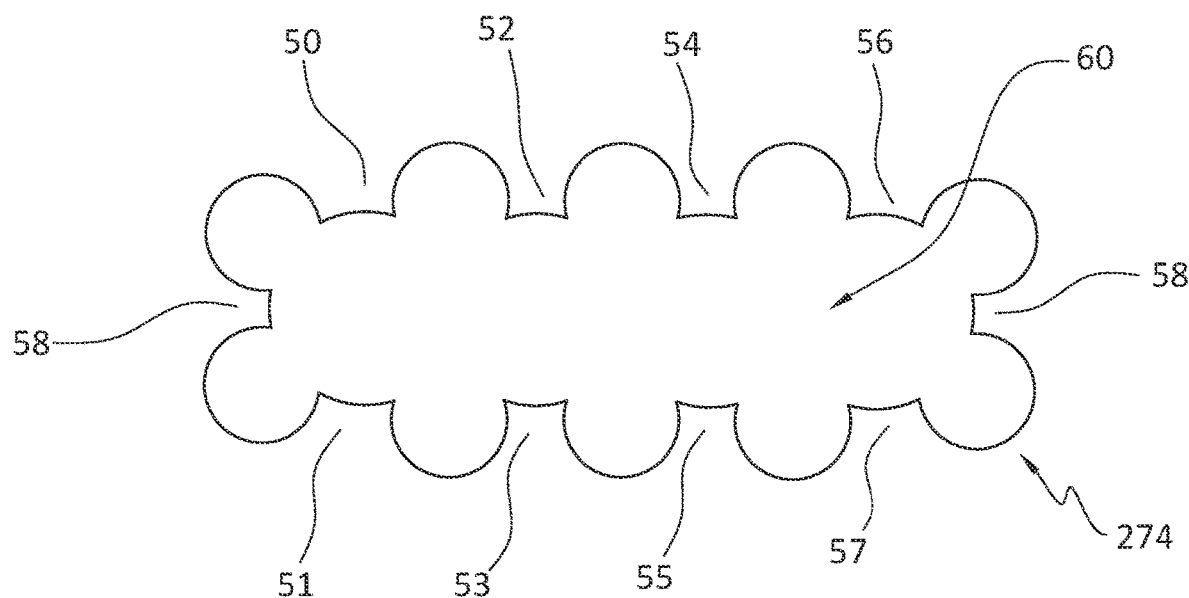
FIG. 5 is a plan view showing a shape of surrounding metal walls of metal following a drilling process which defines a lock receiving recess.

FIG. 5 sets forth areas 50 through 58 that define the shape of the surrounding metal walls of metal 274 following the precise drilling process which define lock 10 receiving recess 60 precisely drilled utilizing drill fixtures shown in FIG. 8 through FIG. 23. The fit of lock 10 is an interference, high friction difference to close the crack.

Figure 6:
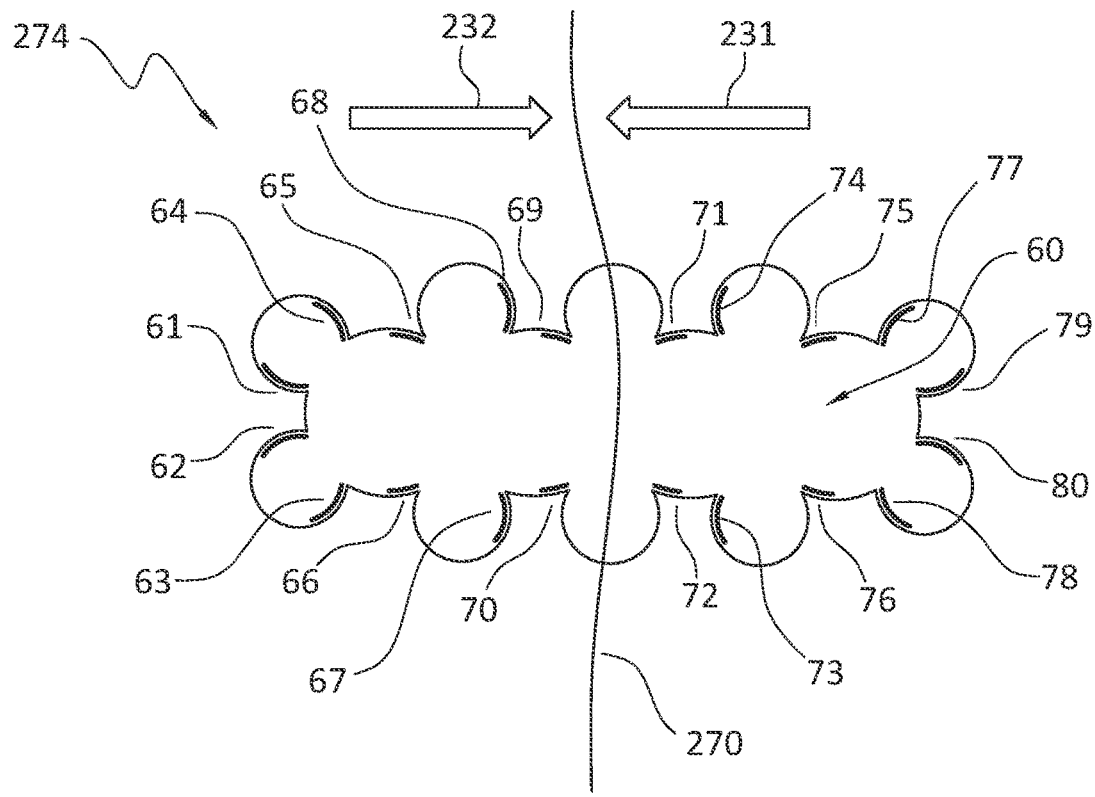
FIG. 6 is a plan view of a metal material having a lock receiving hole pattern drilled into it defining the lock receiving recess.

FIG. 6 sets forth a metal material 274 such as a cast iron, steel or other metal with a lock receiving hole pattern drilled into it defining the lock receiving recess 60. Also shown are the lock first contact areas where the lock 10, is pre-loaded as it is driven into the receiving hole pattern. Contact areas 61 through 70 on the left-hand side and 71 through 80 on the right-hand side indicate where the metal lock 10 makes first contact with the drilled the lock receiving recess 60. These contact points apply the drawing forces required to pull the sides opposite the crack 270 towards each other when considering that lock 10 is manufactured to be shorter than the precision receiving bore 60. The pulling force, 231, 232 acts to pre-stress the lock 10 as it is driven into the lock receiving recess 60 to keep the repair tight.

Figure 7:
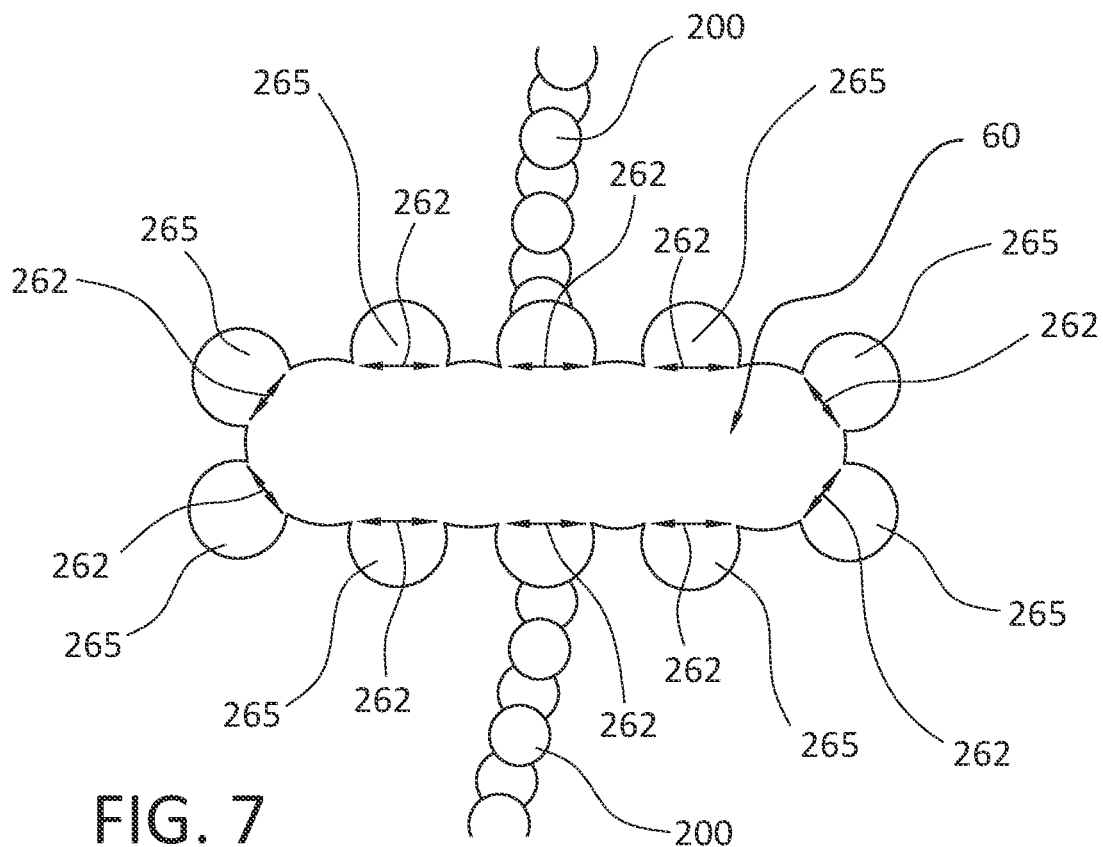
FIG. 7 shows a lock positioned in a lock receiving recess drilled centered and approximately at a right angle to an installation of stitching pins filling a crack.

FIG. 7 reveals the lock 10 is in the lock receiving recess 60 drilled centered and approximately at a right angle to the completed installation of stitching pins 200 filling crack 270 completely. FIG. 7 also highlights the pinch points 262 within the drilled walls of the lock receiving recess 60 having a width smaller than the diameter of round lobe portions 265 of outer lobes 25-34. These pinch-points 262 provide an instant interlock for the lobes 265 when the lock 10 is driven into the lock receiving recess 60. This instant invention accomplishes multi-axis interlocking grip into the surrounding metal 274 which has never been accomplished before in the art of metal stitching to repair cracks in metal 274. This instant invention will interlock with the surrounding metal not only over the length of the lock 10 but also especially at the ends and along the sides of the lock 10. This allows the lock 10 to be interlocked with the surrounding metal on all sides providing a significantly better attachment with the surrounding metal. The distances from the center of the lock 10 adjacent to the crack as shown as 270 in FIG. 6, ends 25, 26, 33, and 34 (FIG. 3). Moreover, overlap of central lobes 22 and 23 is less than 21, and 22, 23 and 24. This means interference pressure increases going to the center and crack 270 along contact areas 61 through 80 and pinch points 262 is shorter than the lock receiving recess 60 of FIG. 6 measuring from its center to each end. The difference in length between said lock 10 and the lock receiving recess 60 is small but enough to never apply a spreading force to the crack 270 or prior stitched repair. Pinch points 262 are chords of a circle of outer lobes 25-34 parallel to the lock long axis. As per FIG. 6, These chords are pulling the lock 10 to close the crack even if pinch points 262 are above the lock 1.

Figure 8:
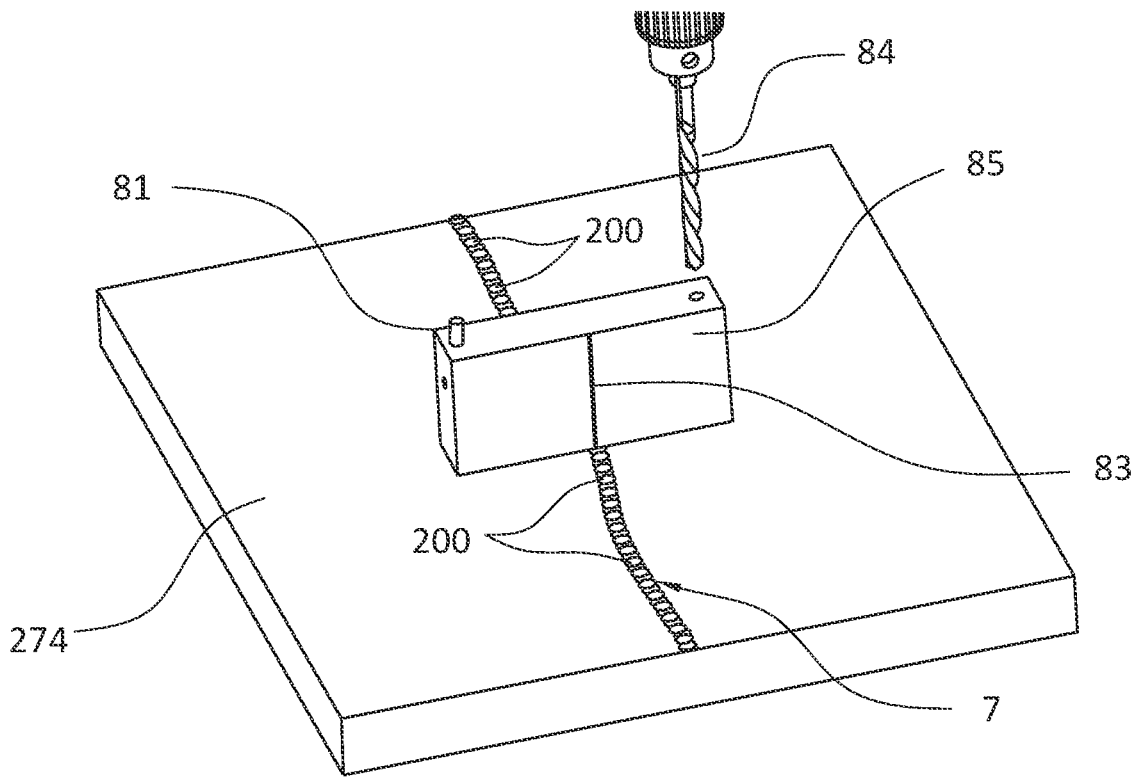
FIG. 8 is a perspective diagrammatic view of a process step locating a pilot hole drill fixture over a stitched repair.

FIG. 8 sets forth a perspective of the pilot hole drill fixture 85 perched over the material 274 to be located over the stitched repair 7 using the line 83 scribed into the side of the drill fixture. A first pilot hole can be drilled through the fixture into metal 274 with drill bit 84.

Figure 9:
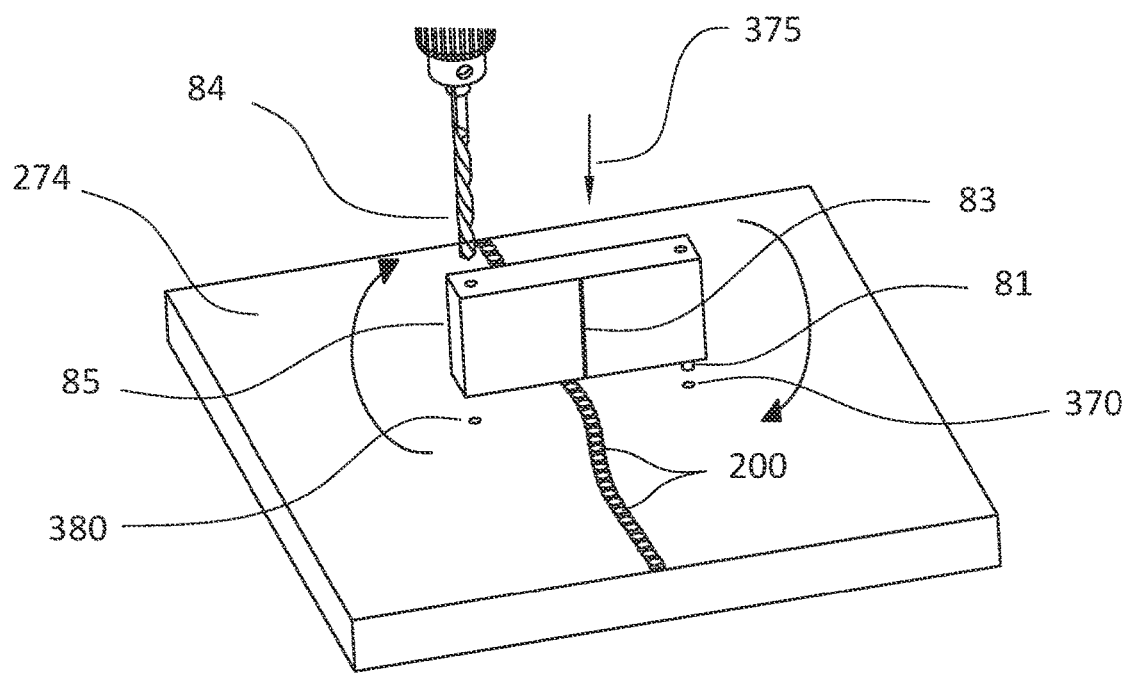
FIG. 9 is a perspective diagrammatic view of a process step of repositioning the pilot hole drilling fixture of FIG. 8 rotated 180 degrees.

FIG. 9 sets forth a perspective view showing the location of the pilot hole drilling fixture 85 rotated 180 degrees prior to insertion of the locating pin 71 into the drilled hole 70. Following the insertion of the locating pin 81 into hole 370, hole 380 is drilled through the fixture with drill bit 84.

Figure 10:
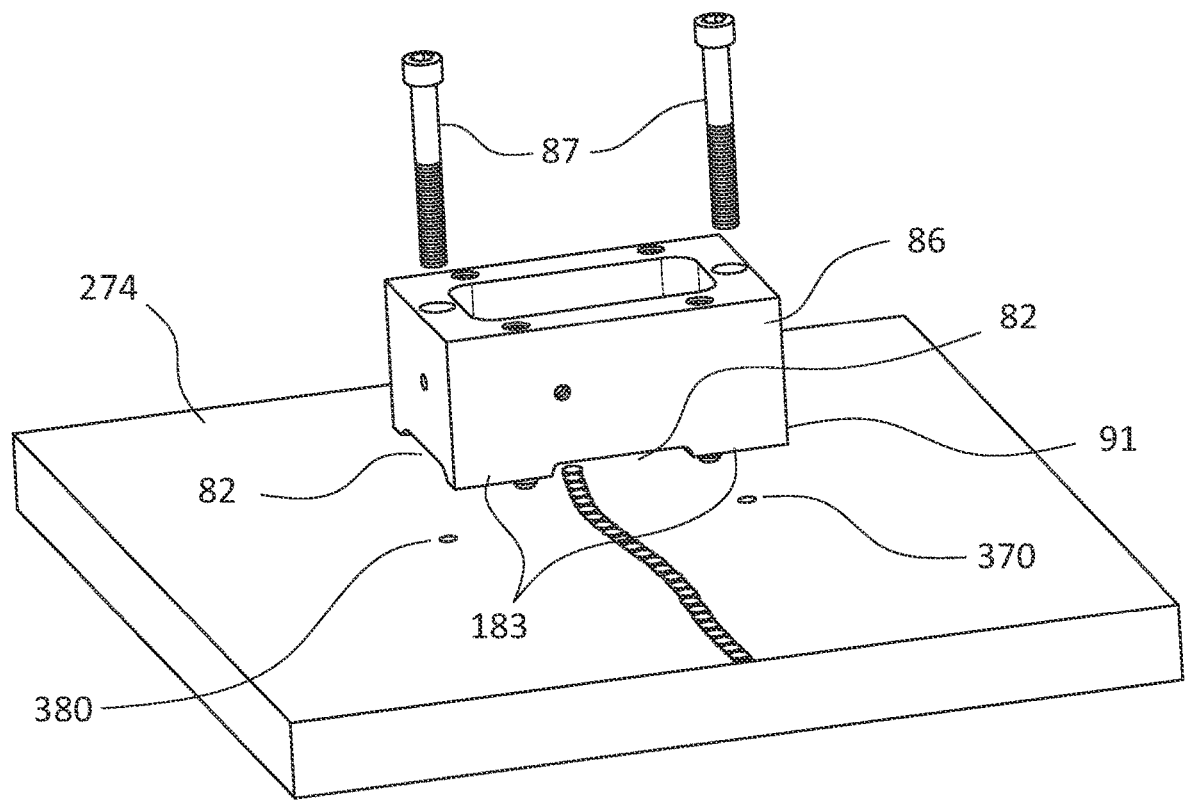
FIG. 10 is a perspective diagrammatic view of a process step of positioning a first drill fixture locating guide in relation to a stitched seam.

FIG. 10 sets forth a perspective view of drill fixture locating guide 86 with channels 82 cut into the bottom side leaving 4 corners 83 that will rest on the metal part 274 to be repaired during the remaining drilling process. Channels 82 provides a route for the drill chips to move away from the bottom of the drill fixture 86 preventing a buildup of drill chips that in prior designs had the ability to lift the fixture from the surface and cause excess heat and wear to the drill fixture. Pilot holes 370 and 380 are tapped to accept bolts 87 to secure the drill fixture locating guide onto the surface of metal piece 274.

Figure 11:
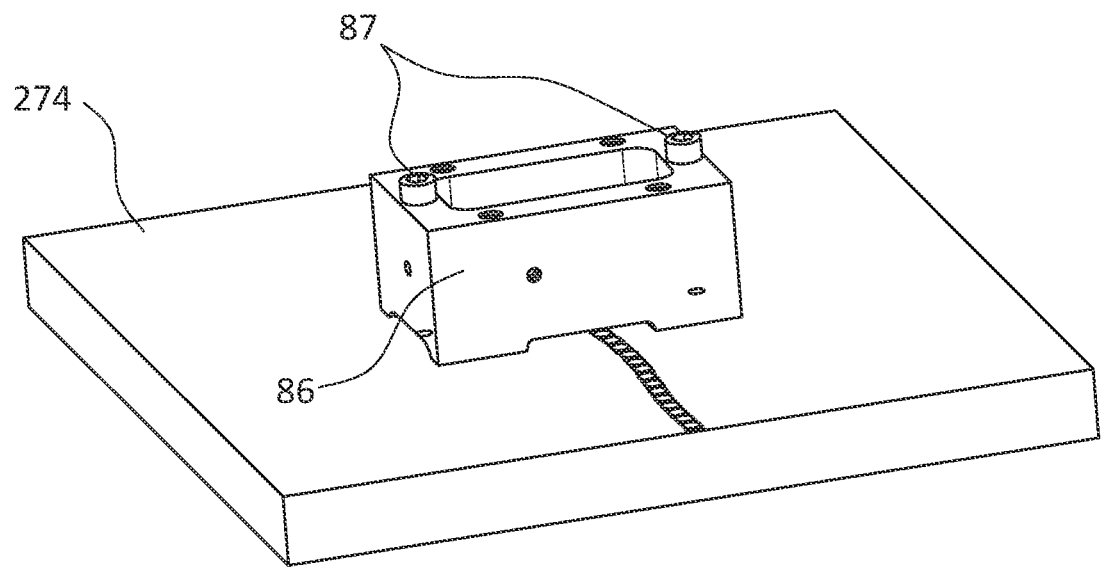
FIG. 11 shows the drill fixture locating guide of FIG. 10 bolted firmly to the surface.

FIG. 11 shows drill fixture locating guide 86 bolted firmly to the surface with bolts 87

Figure 12:
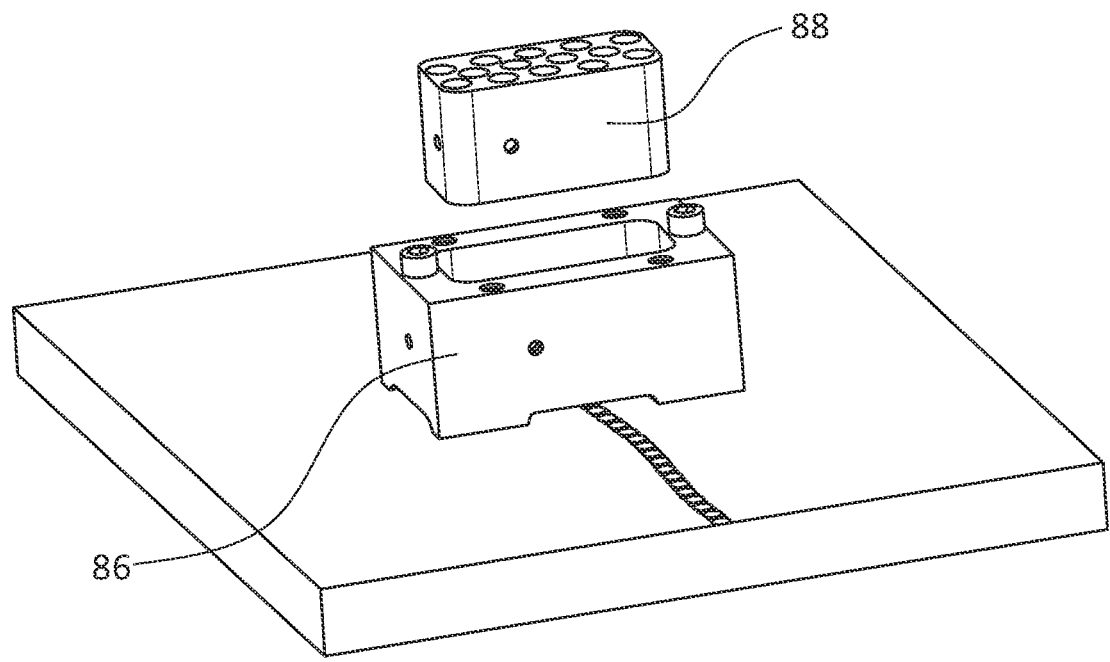
FIG. 12 is a perspective diagrammatic view of a process step of positioning a first drill guide in the drill fixture locating guide.
Figure 13:
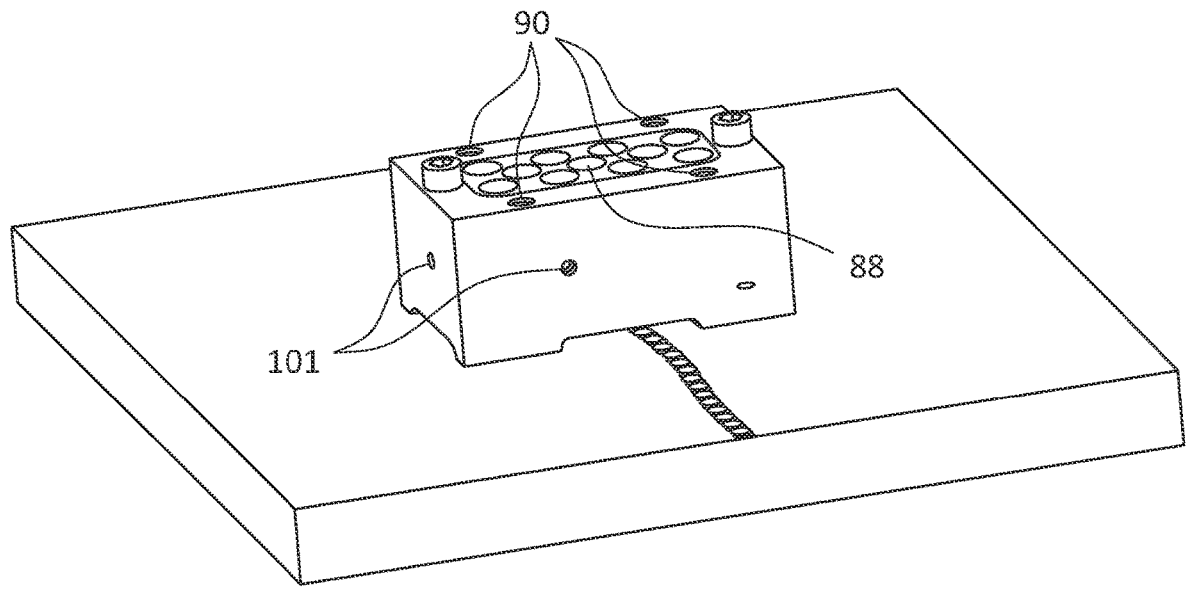
FIG. 13 is a perspective view showing the first drill guide positioned in the drill fixture locating guide.

FIG. 12 sets forth a perspective assembly preview of the drill guide 88 perched over the installed drill fixture locating guide 86;

FIG. 13 sets forth a perspective view of the present invention showing the right-angle drill platform plate mounting holes 90 and the first drill guide 88 secured in place with set screws 101

Figure 14:
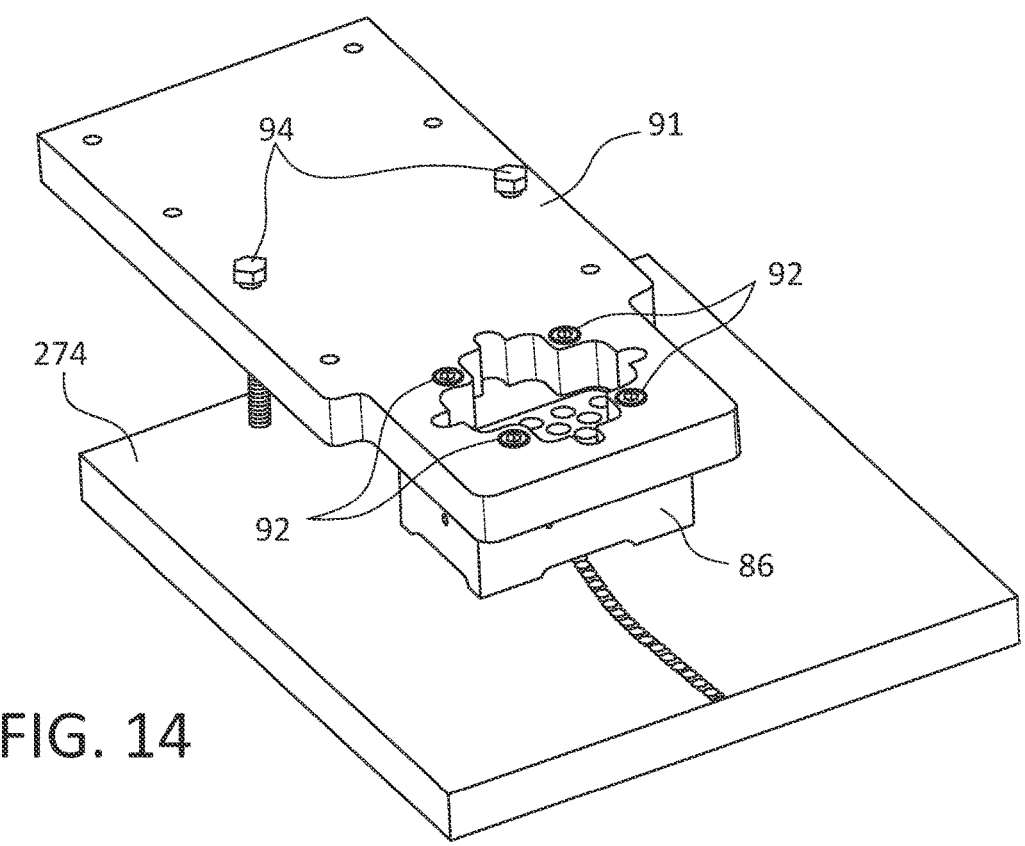
FIG. 14 is a perspective view showing a drill right-angle drill plate mounted to the drill fixture locating guide.

FIG. 14 sets forth a perspective view of the drill right-angle drill plate 91 mounted to the drill fixture locating guide 86 with bolts 92 and jacking bolts 94 installed to prevent deflection of the mounting plate when a magnetic base drill motor is attached to the right angle drill mounting plate 91 to drive the drill bits with when necessary.

Figure 15:
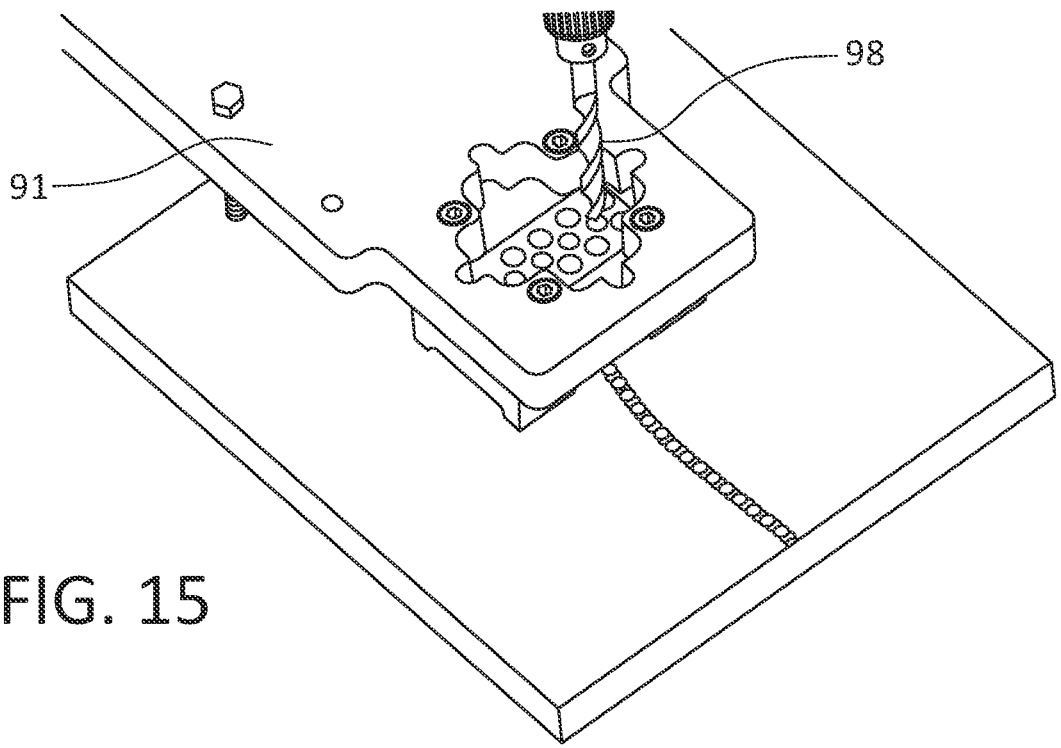
FIG. 15 is a perspective diagrammatic view of a process step of positioning a drill bit to drill a first hole of a lock receiving hole pattern, forming a lock receiving recess.

FIG. 15 sets forth a drill bit 98 perched over the right angle drill plate 91 to drill the first hole for the lock receiving hole pattern, forming the lock receiving recess 60, (FIG. 7)

Figure 16:
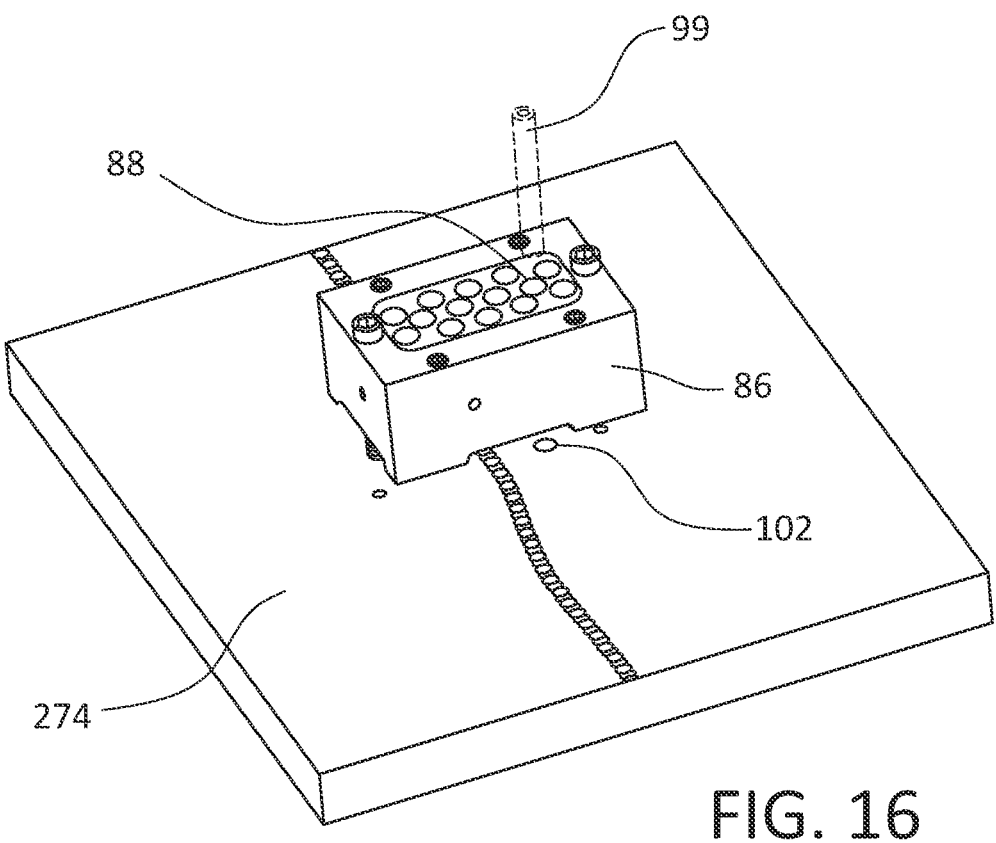
FIG. 16 is a perspective diagrammatic view of a process step of positioning a first dowel pin into the first hole to maintain a precise location of the drill fixture locating guide.

FIG. 16 sets forth a view of a dowel pin 99 ready to be installed into the first hole 102 drilled in FIG. 15 to maintain a precision location of the fixture to the newly drilled hole.

Figure 17:
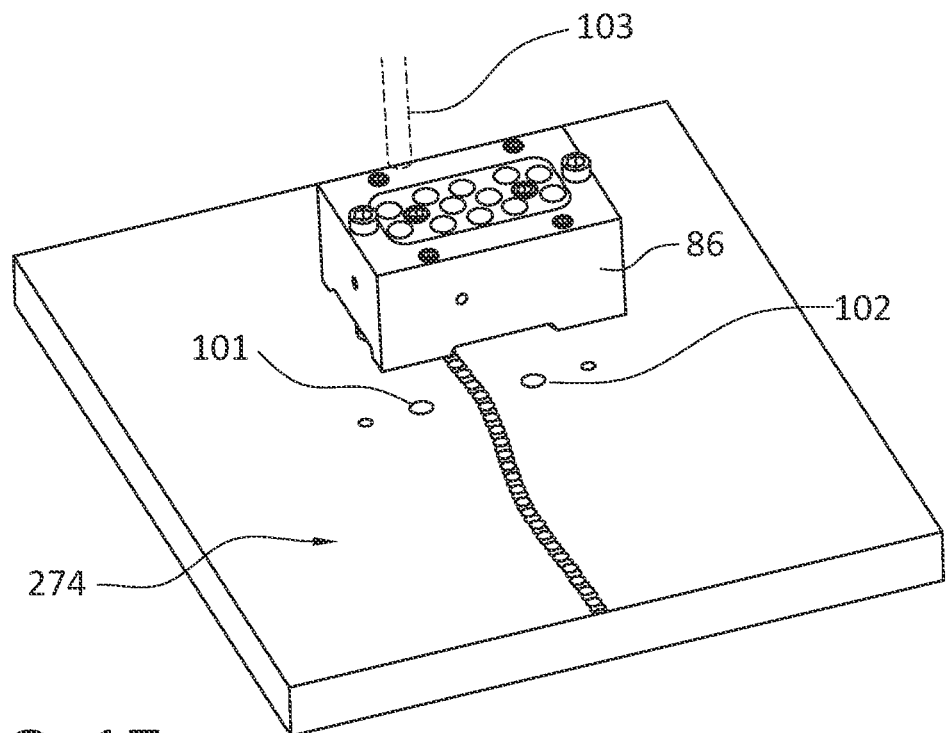
FIG. 17 is a perspective diagrammatic view of a process step of positioning a second dowel pin.

FIG. 17 shows a second dowel pin 103 ready to be inserted through the drill guide into hole 101.

Figure 18:
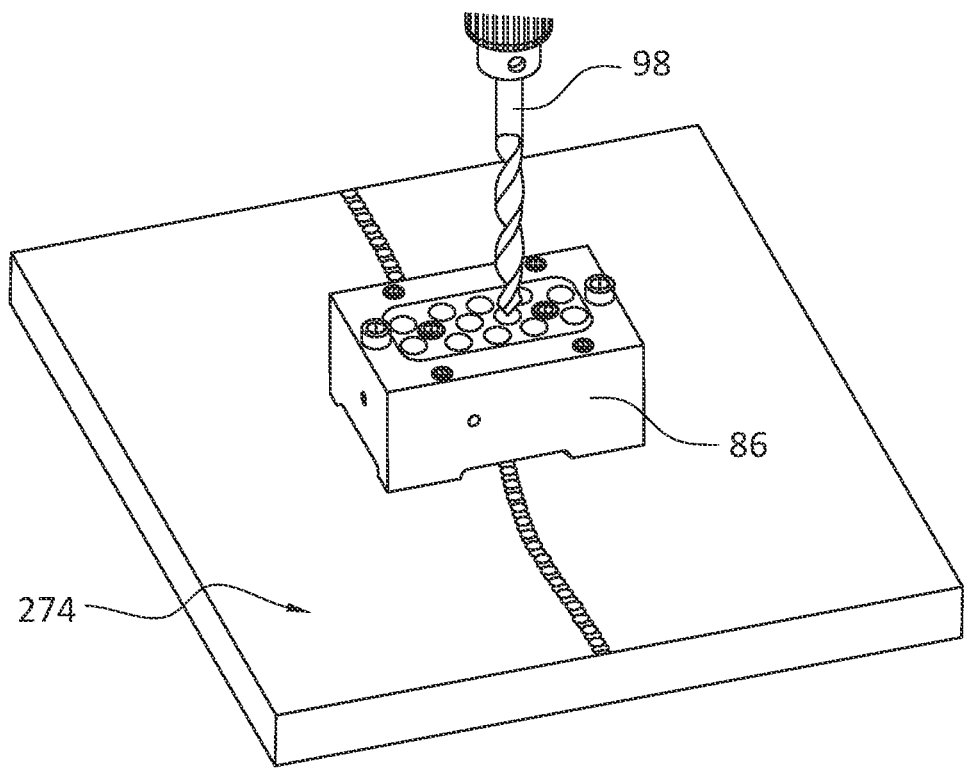
FIG. 18 is a perspective view showing the drill bit positioned to drill subsequent holes forming the lock receiving recess hole pattern.

FIG. 18 sets forth the continuation of drilling all remaining 12 same sized holes through the drill guide into the base metal and finishing this first series of holes forming the lock receiving recess 60.

Figure 19:
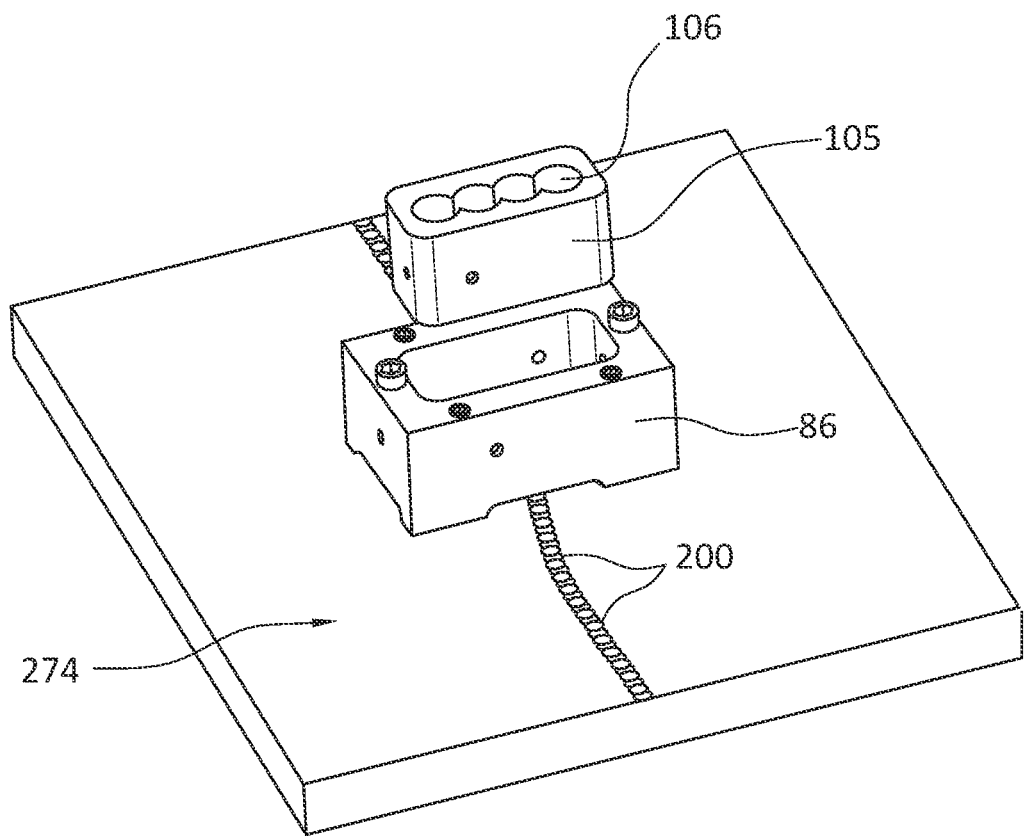
FIG. 19 is a perspective diagrammatic view of a process step of positioning a final drill guide in the drill fixture locating guide.

FIG. 19 shows the final drill guide 105 with holes 106 drilled through it to accept the last and large size drill bit.

Figure 20:
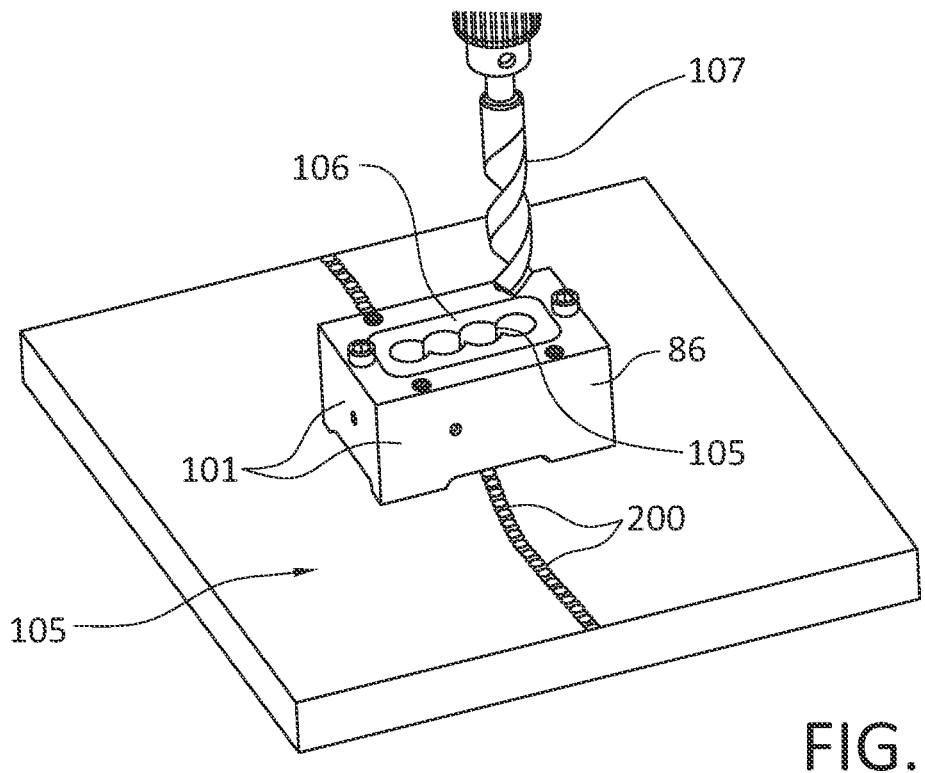
FIG. 20 is a perspective diagrammatic view showing the final drill guide in place and ready to receive a drill bit for completing the completing the lock receiving recess hole pattern.

FIG. 20 shows the final drill guide 105 secured in place with set screws 101 and ready to receive large drill bit 107 to finish the drilling of the remaining four larger holes to connect all other holes together and completing the lock receiving recess 60 so the lock 10 can be hammered into place.

Figure 21:
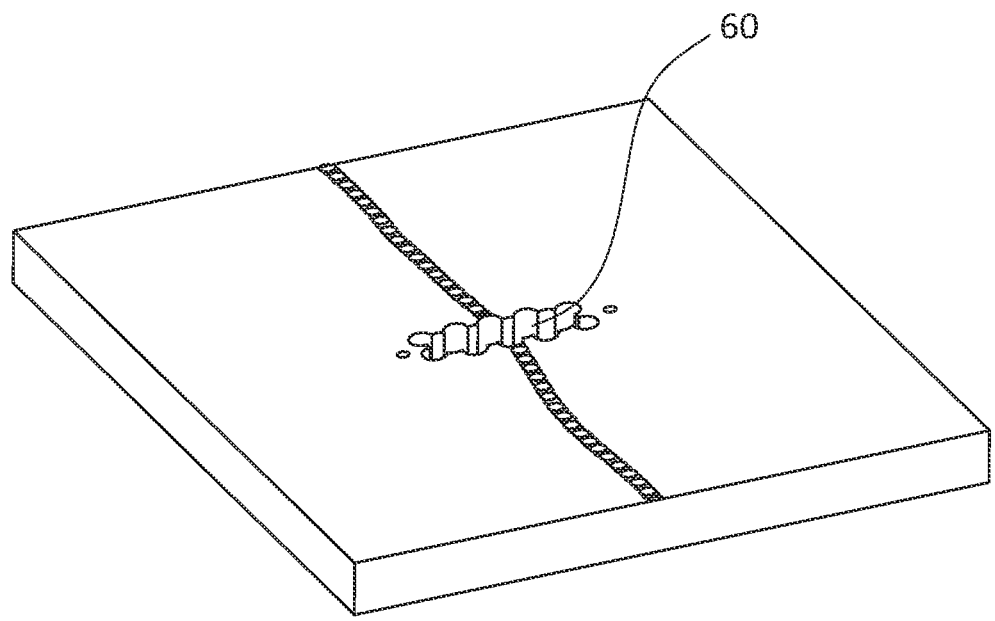
FIG. 21 is a perspective view of the completed lock receiving recess hole pattern.

FIG. 21 sets forth a view of the completed lock hole pattern forming the lock receiving recess 60 across the repaired crack.

Figure 22:
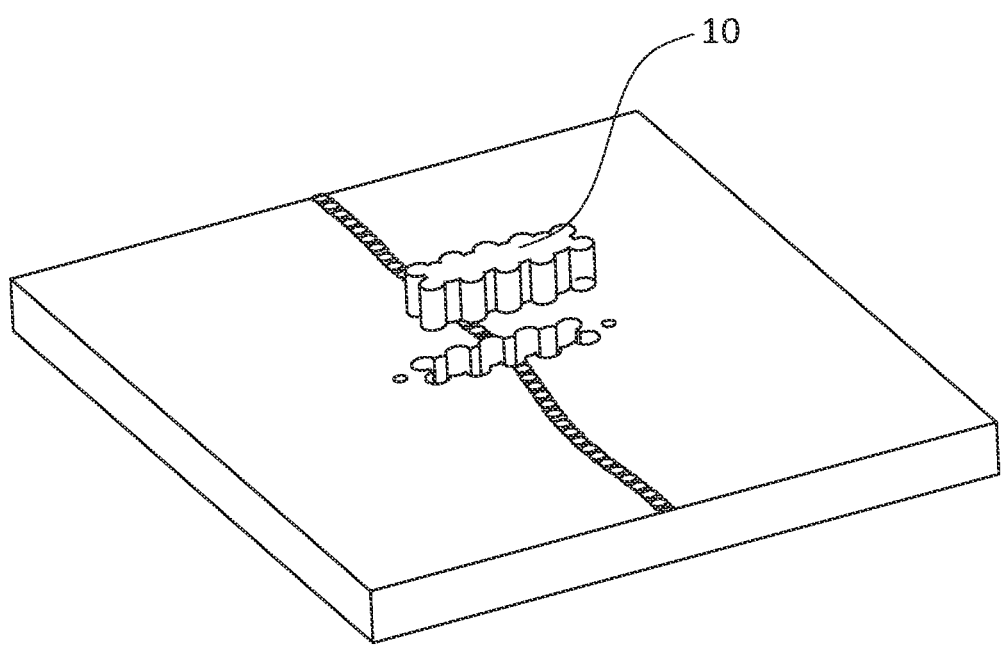
FIG. 22 is a perspective diagrammatic view of a process step of positioning a lock for insertion into the completed lock receiving recess.

FIG. 22 sets forth a view of lock 10 ready to be driven into the lock receiving recess 60.

Figure 23:
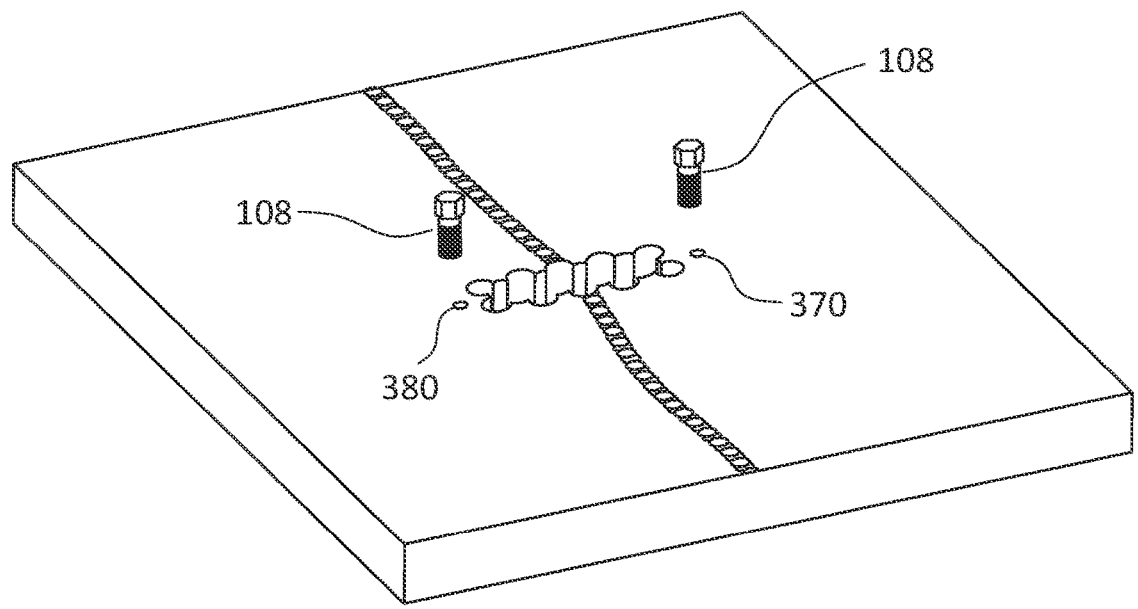
FIG. 23 is a perspective view showing screws ready to be screwed into threaded holes.

FIG. 23 sets forth a view of screws 108 ready to be screwed into threaded holes 370 and 380 to block them off and seal them permanently.

FIG. 24 shows a perspective view of a semi completed repair process in progress and tap 300 which forms the threads in the crack 270.

The invention claimed is:

1. A lock and pin combination comprising:
    said lock having an external contour complemental to a recess formed substantially across a crack but said lock slightly smaller dimensionally than the recess, a plurality of pins adapted to be received all along the crack, the crack provided with thread patterns complemental to threads of said pins, said pin threads and said crack threads having a contour which precludes the through passage of fluid there beyond;
    wherein said pin comprises a thread root located between inside corners of adjacent tooth flanks, and
    a thread pattern of said thread has a variable pitch.

2. The lock and pin combination of claim 1, wherein said thread root has a curved contour, said tooth flanks all having radiused crests.

3. The lock and pin combination of claim 2 wherein said thread pattern provides an interference connection as said pin advances into a complementary bore.

4. The lock and pin combination claim 1 in which a tap is provided having a contour forming the complementary bore.

5. The lock and pin combination of claim 1 wherein said lock has a long axis disposed substantially perpendicular to the crack to be repaired, and means are provided at the extremities of said long axis to prevent rotation of said lock when it is placed in a substantially complemental recess.

6. The lock and pin combination of claim 5 wherein a plurality of central lobes are oriented on the long axis, and a plurality of peripheral lobes circumscribe said central lobes.

7. The lock and pin combination of claim 6 wherein said central lobes have a greater diameter than said peripheral lobes.

8. The lock and pin combination of claim 7 wherein said central lobes overlap each other, and a portion of said peripheral lobes overlap said central lobes to provide a constrictive area, defining pinch points in the recess.

9. The lock and pin combination of claim 8 wherein said central lobes overlap each other with different magnitudes of overlap, thereby providing pinch points when disposed in the recess.

10. A lock for repairing a crack in a material wherein said lock is placed along the crack substantially perpendicular to the crack in a complemental recess, said lock having a long axis and a plurality of lobes circumscribing its outer periphery, the plurality of lobes including lobes of differing diameters, such that any attempt at crack migration is thwarted by said lobes.

11. The lock of claim 10, wherein the long axis is disposed substantially perpendicular to the crack to be repaired, and means are provided at the extremities of said long axis to prevent rotation of said lock when it is placed in a substantially complemental recess.

12. The lock of claim 11 in which a plurality of central lobes are oriented on the long axis, and a plurality of peripheral lobes circumscribe said central lobes.

13. The lock of claim 12 in which said central lobes have a greater diameter than said peripheral lobes.

14. The lock of claim 13 in which said central lobes overlap each other, and a portion of said peripheral lobes overlap said central lobes to provide a constrictive area, defining pinch points in the recess.

15. The lock of claim 14 in which said central lobes overlap each other with different magnitudes of overlap, thereby providing pinch points when disposed in the recess.

* * * * *